United States Patent
Bream et al.

(10) Patent No.: US 6,521,156 B1
(45) Date of Patent: Feb. 18, 2003

(54) APPARATUS AND METHOD FOR HANDLING EXTRUDED TUBES

(75) Inventors: Jeffrey Linn Bream, Bethlehem, PA (US); George John Shevchuk, Old Bridge, NJ (US); Philip Habbauer, Millington, NJ (US); Thomas Edward Stockert, Millburn, NJ (US); John Burnette MacChesney, Lebanon, NJ (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/415,746

(22) Filed: Oct. 12, 1999

(51) Int. Cl.$^7$ .............................................. B29C 47/08
(52) U.S. Cl. ................. 264/211.12; 425/190; 425/377; 65/401
(58) Field of Search ...................... 264/177.17, 177.19, 264/211.12, 211.13, 211.18, 211.19, 211.2; 425/190, 377; 65/401

(56) References Cited

U.S. PATENT DOCUMENTS

| | | | | |
|---|---|---|---|---|
| 4,857,245 A | * | 8/1989 | Oshima et al. | ........... 264/211.2 |
| 5,009,825 A | * | 4/1991 | Lurie | ..................... 264/211.12 |
| 5,205,991 A | * | 4/1993 | Avery et al. | ........... 264/211.12 |
| 5,656,220 A | * | 8/1997 | Whittemore et al. | ......... 264/43 |
| 5,925,309 A | * | 7/1999 | Whittemore et al. | ... 264/211.11 |

* cited by examiner

Primary Examiner—Jan H. Silbaugh
Assistant Examiner—Joseph Leyson
(74) Attorney, Agent, or Firm—Darby & Darby

(57) ABSTRACT

A tube take-up apparatus is provided to handle a length of freshly extruded tube. The apparatus includes an elongated housing in which a pair of parallel, spaced-apart rollers extend lengthwise in a position just below the extruded tubing. The housing is removably mounted on an elongated supporting fin which is secured to the extruder at its near end, extends upwardly between the two rollers and substantially along the entire length of the housing, and is, in turn, supported on a fixed pedestal at its remote end. After the full length of tubing has been extruded, the housing and rollers as a unit are lifted with the tube from the supporting fin and replaced by an empty housing, to extrude the next tube, while the full housing is carried away to a dryer.

19 Claims, 3 Drawing Sheets

APPARATUS AND METHOD FOR HANDLING EXTRUDED TUBES

FIELD OF THE INVENTION

The present invention relates generally to the manufacture of extruded tubes and, more particularly, concerns an apparatus and method for handling freshly extruded tubes in order to avoid damaging them or distorting their shape.

BACKGROUND OF THE INVENTION

Optical fiber is produced by drawing a glass structure known as a "preform." The preform may include a substrate tube and an over cladding tube, which need to have a precise size and shape in order to assure the quality of the ultimate fiber. These tubes have typically been manufactured by high-temperature deposition, drill, and draw or by a casting process, but such processes are relatively slow and the latter requires the simultaneous casting in hundreds of molds to produce a sufficient quantity of tubes to make the process commercially feasible.

It would therefore be desirable to manufacture these silica tubes by an extrusion process which would be relatively continuous and, therefore, faster and more efficient than the casting process.

The extrusion process, however, introduces its own complications. The relatively thin-walled tubes (about 40 millimeters in diameter with a wall thickness of about 5 millimeters) are extruded to a length of about 6 feet in order for the process to be practical, and are in a relatively soft state when first extruded. Moreover, the tubes must be handled extremely carefully in order to avoid damaging their surface or distorting their shape. In particular, the tube must not only be supported as it leaves the extruder, but must be supported on a moving surface which draws it away from the nozzle of the extruder. This is necessary in order to assure that the tube exiting by the extruder does not stick to the supporting surface and thereby become distorted or damage. Ceramic extruded tubes have been handled on inclined conveyor belts, but the silica tubing is too delicate and must meet far too stringent structural requirements to be subjected to such treatment. In addition, it is then necessary for each extruded length of tube to be supported and protected while it is carried away to a dryer. In the dryer, the tubes are typically supported on rotating rollers and dried for one or two days. The rotating rollers not only assure uniform drying, but guarantee that flat spots are not formed in the tubing.

In accordance with the present invention, a tube take-up apparatus is provided to handle a length of extruded tube. The apparatus includes an elongated housing which is removably securable to the extruder nozzle at a near end and extends away from it. A pair of parallel, spaced-apart rollers of a diameter approximately equal to the diameter of the extruded tubing extend along the length of the housing in a position just below the extruded tubing. The housing is removably mounted on an elongated supporting fin which is secured to the extruder at its near end and extends upwardly between the two rollers and substantially along the entire length of the housing. The supporting fin is, in turn, mounted on a fixed supporting base at its remote end. In operation, a fin ribbon made of a non-stick material, such as teflon, is supported on the upper edge of the supporting fin, and the tube is deposited on top of the ribbon as it is extruded. Simultaneously, the ribbon is drawn away from the extruding nozzle, so as to assist in drawing the extruded tube away from the nozzle and to prevent it from scraping along the supporting surface. The housing is dimensioned so that a full length of extruded tubing will fit in it. After the full length has been extruded, the housing and rollers as a unit are lifted from the supporting fin and are carried away as a unit to a dryer, with the extruded tube supported on the two rollers. Preferably, the axles of the rollers extend from the remote end of the housing and are adapted to be coupled to a motor which will drive them into rotation. The tube may therefore be dried directly within the housing, without any additional handling. In order to accommodate the next extruded tube, another housing/roller assembly is mounted on the supporting fin as the original one is removed, and the next tube is extruded.

BRIEF DESCRIPTION OF THE DRAWINGS

The preceding brief description, as well as other objects, features and advantages of the present invention will be understood more completely from the following detailed description of presently preferred embodiment, with reference being had to the accompanying drawings, which.

DETAILED DESCRIPTION OF THE PREFERRED EMBODIMENT

Figure 1:
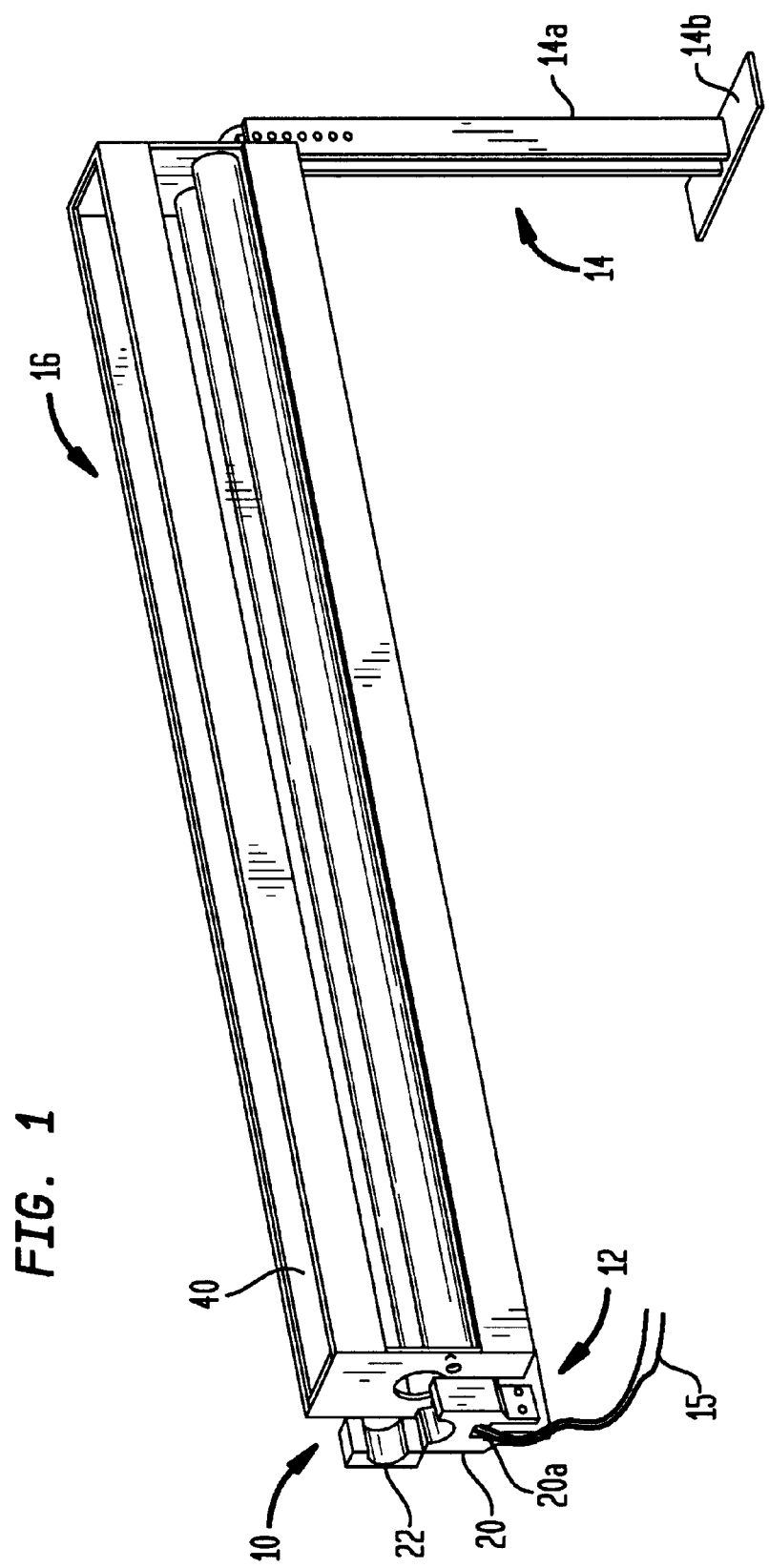
FIG. 1 is a perspective view of a preferred embodiment of an apparatus for handling extruded tubing in accordance with the present invention.
Figure 2:
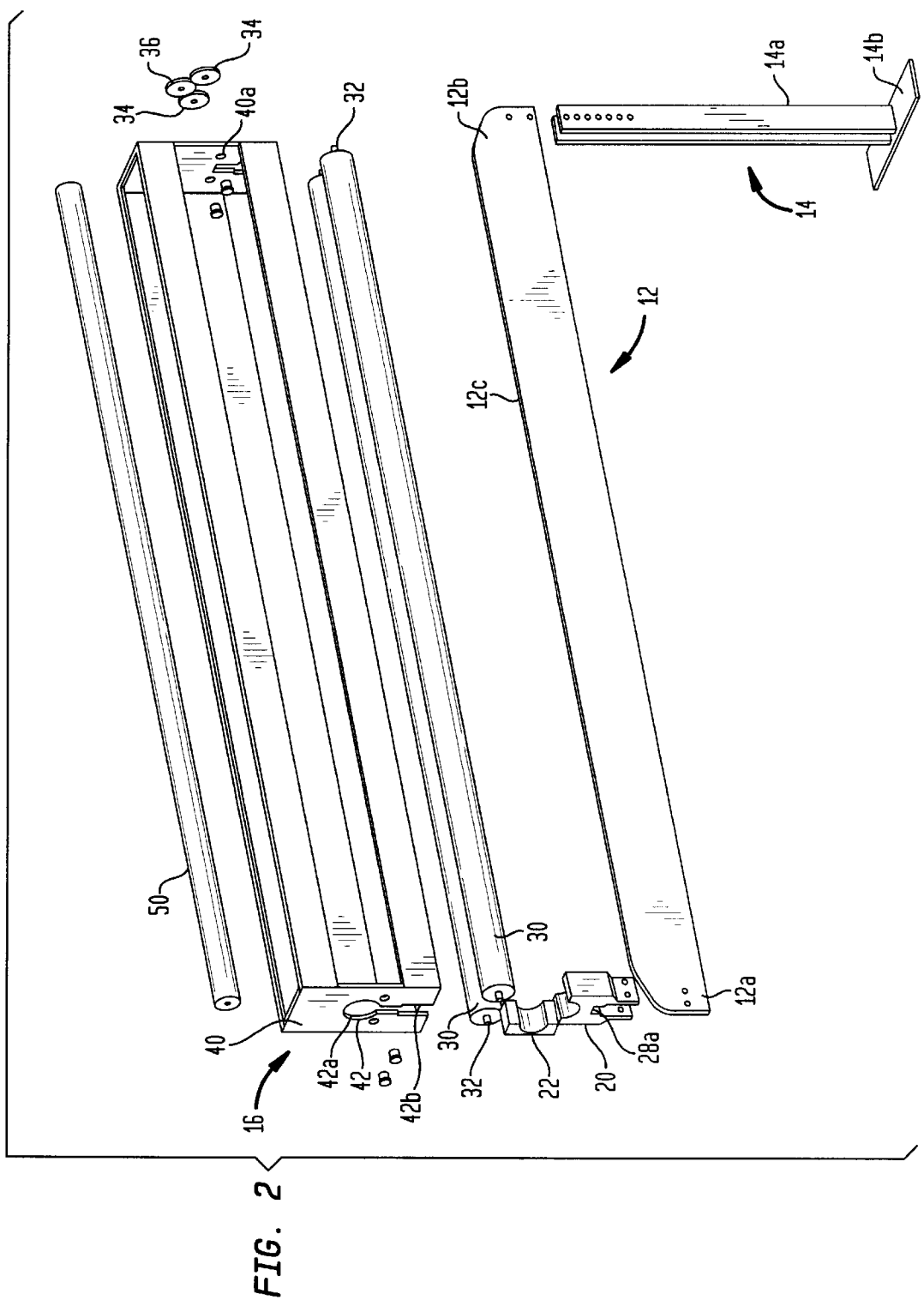
FIG. 2 is an exploded view of the apparatus of FIG. 1, further including an extruded tube.

Turning now to the details of the drawings, FIG. 1 is a perspective view of an extruded tube take-up and handling apparatus 10 embodying the present invention, and FIG. 2 is an exploded view thereof. Apparatus 10 broadly comprises a supporting fin 12, a pedestal 14, and a housing/roller subassembly 16. In use, the near end of supporting fin 12 is secured to the tubular nozzle of an extruder through an appropriate clamping fixture 20, and the remote end is supported on pedestal 14. Housing subassembly 16 is constructed to fit over fin 12 and to be mounted thereupon with the fin extending upwardly between rollers 30, 30 (see FIG. 3). In this manner, housing subassembly 16 is secured and retained in position upon fin 12.

Fin 12 and pedestal 14 are preferably made of a sturdy metal material, such as steel or aluminum. The near end 12a of fin 12 has a clamping fixture 20 mounted thereon by conventional means, such as rivets or screws. Similarly, the remote end 12b of the fin is mounted to an upright component 14a of pedestal 14, also by conventional means, and component 14a is secured upon a base component 14b. For reasons to be explained further below, clamping fixture 20 is provided with a through-notch 20a, which provides clearance above fin 12. In the drawings, fixture 20 is shown with a top portion 22 pivoted to an open position. However, those skilled in the art will appreciate that the top portion 22 may be pivoted forward and downwardly to a closed position around the nozzle of an extruder and securely retained in place by conventional means, not shown. It will be appreciated that the cylindrical recesses in the two parts of clamping fixture 20 must be shaped to receive the extruding nozzle. For reasons which will become apparent below, the upper edge 12c of fin 12 is perfectly formed so as to be cylindrically concave, with a curvature that matches the outside curvature of the extruded tube 50.

Figure 3:
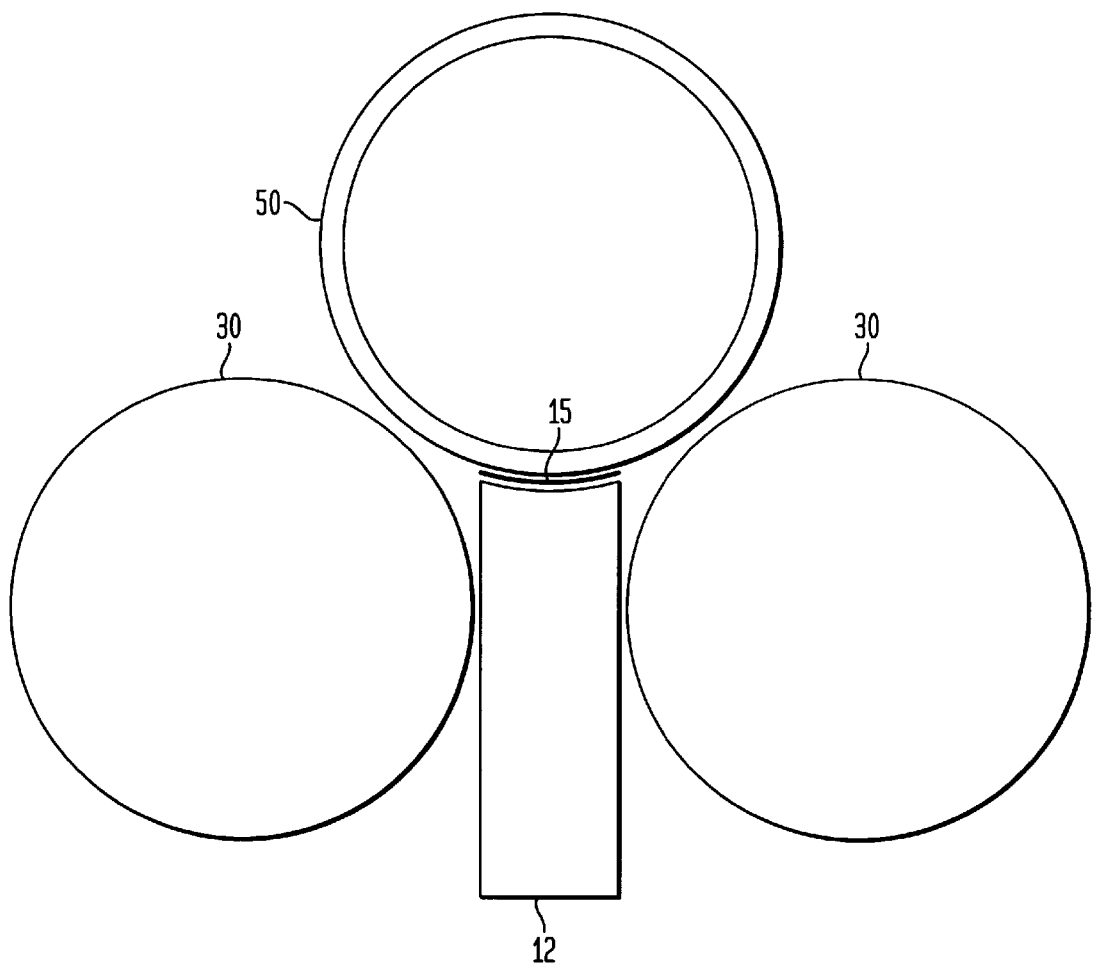
FIG. 3 is an edge view, on enlarged scale with the housing removed, showing the relationship between the rollers, an extruded tube, and the support fin when the housing is mounted on the support fin.

Housing/roller subassembly 16 includes a housing 40, preferably fabricated from sheet metal. The rollers 30,30 are mounted for rotation lengthwise in the housing by having their axles 32 protrude through bearings in appropriate bores 40a in housing 40. At its remote end, each roller 30 has a gear 34 mounted thereon exterior of the housing. For example, the end of spindle 32 could be made square and the gear 34 provided with as conforming square opening allowing for a press fit. In addition, a gear 36 is mounted for rotation on the exterior of housing 40 so as to be in engagement with the gears 34, 34. As best seen in FIG. 3, the rollers 30,30 are spaced far enough apart to permit fin 12 to slip freely there between.

As best seen in FIG. 2, housing 40 is provided at its forward end with a keyhole-shaped cutout 42. The upper portion of cutout 42 is a circular opening 42a positioned to align with the extruder nozzle. The lower portion 42b of cutout 42 is dimensioned to be received snugly over fin 12, and above portion 42b, the width of the opening is reduced. Cutout portion 42b and the reduced width portion are repeated at the remote end of housing 40.

In use, housing 40 is slipped over fin 12 and pressed down thereupon, with cutout portions 42b limiting the downward movement of the housing. In this position, the extruder nozzle is aligned with cutout portion 42a and the clamping fixture 20 is secured thereupon. The apparatus 10 is then ready to take-up the tube 50 during extrusion.

As best seen in FIG. 3, the upper surface 12c of fin 12 is formed so as to be cylindrically concave and to confirm to the curvature of the extruder tube 50. A ribbon 15, preferably made of a non-stick material, such as teflon, is provided on the upper edge 12c of fin 12 and is moved along the top edge, away from the extruding nozzle at the same rate that the tube 50 is extruded. Preferably, ribbon 15 is provided as a closed loop and is driven into movement by conventional means, or by movement of the tube 50 itself.

In operation, the extruding nozzle deposits tube 50 upon ribbon 15, and the forward end of tube 50 is moved gently towards the remote end of the housing as it is extruded. After the full length of tube 50 has been extruded, the housing/roller assembly 16 may be lifted from fin 12, whereby the rollers lift the tube off the ribbon, and replaced by another, empty housing. Extrusion of another tube may then begin immediately. The housing with the extruded tube in it may then be conveniently carried to a dryer and left within the dryer for a period of days. During that time, a motor drive would be coupled to gear 36, whereby tube 50 is gently rotated during drying.

It will therefore be appreciated that subassembly 16 provides a protective environment for tube 50 from the moment that its extrusion begins until the moment that it is fully hardened. During that time, subassembly 16 makes it possible to handle and transport the tubing without danger of damage or distortion to it. Furthermore, the tubing is conveniently placed within a dryer and subjected to the usual rolling action without handling it at all. Best of all, the present invention permits relatively continuous extrusion of the silica tubes.

Although preferred embodiments of the invention have been disclosed for illustrative purposes, those skilled in the art will appreciate that many additions, modifications and substitutions are possible, without departing from the scope and spirit of the invention as defined by the accompanying claims.

What is claimed:

1. An apparatus for handling objects emitted from an extruder, comprising:

an elongated support fin having an upper edge and mounted to extend lengthwise away from said extruder in a direction that objects are emitted; and an elongated housing removably supported on said fin so that the fin upper edge extends upward into said housing to support objects that are being extruded, said housing including a bottom support through which said fin extends, such that when the housing is removed from said fin, the extruded object is supported upon said bottom support.

2. An apparatus in accordance with claim 1, the bottom support comprising a pair of opposed rollers extending along the length of the housing, with the fin upper edge protruding between them.

3. An apparatus in accordance with claim 2, wherein the rollers are mounted for rotation about axes extending along the length of the housing.

4. An apparatus in accordance with claim 3 further comprising a mechanical linkage permitting at least one of the rollers to be driven into rotation.

5. An apparatus in accordance with claim 4 wherein the fin upper edge is cylindrically concave.

6. An apparatus in accordance with claim 1 further comprising a ribbon of low tack material disposed on the fin upper edge for movement along the edge so as to receive objects emitted from the extruder.

7. An apparatus in accordance with claim 6, the bottom support comprising a pair of opposed rollers extending along the length of the housing, with the fin upper edge protruding between them.

8. An apparatus in accordance with claim 7, wherein the rollers are mounted for rotation about axes extending along the length of the housing.

9. An apparatus in accordance with claim 8 further comprising a mechanical linkage permitting at least one of the rollers to be driven into rotation.

10. An apparatus in accordance with claim 9 wherein the fin upper edge is cylindrically concave.

11. An apparatus in accordance with claim 1, wherein said fin upper edge is shaped to conform to the exterior of the emitted objects.

12. An apparatus in accordance with claim 11 further comprising a ribbon of low tack material disposed on the fin upper edge for movement along the edge so as to receive objects emitted from the extruder.

13. An apparatus in accordance with claim 12, the bottom support comprising a pair of opposed rollers extending along the length of the housing, with the fin upper edge protruding between them.

14. An apparatus in accordance with claim 13, wherein the rollers are mounted for rotation about axes extending along the length of the housing.

15. An apparatus in accordance with claim 14 further comprising a mechanical linkage permitting at least one of the rollers to be driven into rotation.

16. A method for handling objects emitted from an extruder, said method making use of an apparatus including an elongated support fin having an upper edge and mounted to extend lengthwise away from said extruder in the direction that objects are emitted and an elongated housing removably supported on said fin so that the fin upper edge extends upward into said housing to support objects that are being extruded, said housing including a bottom support through which said fin extends, such that when the housing is removed from said fin, the extruded object is supported upon said bottom support, said method comprising the steps of:

maintaining the housing in its mounted position on the fin to receive at least one emitted object;

removing from the fin the housing containing said at least one emitted object; and mounting a second, empty housing on the fin to receive at least one additional emitted object; whereby objects are emitted from the extruder on a substantially continuous basis, and objects in removed housings are handled for further processing.

17. The method of claim 16 performed with said apparatus in which the bottom support includes a pair of opposed rollers extending along the length of the housing, with the fin upper edge protruding between them, the rollers being mounted for rotation about axes extending along the length of the housing, the apparatus further including a mechanical linkage permitting at least one of the rollers to be driven into rotation, said method further comprising the step of providing a drive to the mechanical linkage so as to cause at least one of the rollers to rotate.

18. The method of claim 17 performed with said apparatus further including a ribbon of low tack material disposed on the fin upper edge for movement along the edge so as to receive objects emitted from the extruder, the method further comprising the step of moving the ribbon along the fin upper edge at substantially the same speed at which objects are emitted.

19. The method of claim 16 performed with said apparatus further including a ribbon of low tack material disposed on the fin upper edge for movement along the edge so as to receive objects emitted from the extruder, the method further comprising the step of moving the ribbon along the fin upper edge at substantially the same speed at which objects are emitted.

* * * * *

UNITED STATES PATENT AND TRADEMARK OFFICE
CERTIFICATE OF CORRECTION

PATENT NO.    : 6,521,156 B1
DATED         : February 18, 2003
INVENTOR(S)   : Jeffrey L. Bream et al.

It is certified that error appears in the above-identified patent and that said Letters Patent is hereby corrected as shown below:

<u>Title page,</u>
Item [75], delete "Philip Habbauer" and substitute -- Philip Hubbauer --.

Signed and Sealed this

Twenty-second Day of July, 2003

JAMES E. ROGAN
*Director of the United States Patent and Trademark Office*